United States Patent [19]

Radford

[11] Patent Number: 4,474,728
[45] Date of Patent: Oct. 2, 1984

[54] NEUTRON ABSORBER PELLETS WITH MODIFIED MICROSTRUCTURE

[75] Inventor: Kenneth C. Radford, Churchill Boro, Pa.

[73] Assignee: Westinghouse Electric Corp., Pittsburgh, Pa.

[21] Appl. No.: 334,720

[22] Filed: Dec. 28, 1981

[51] Int. Cl.$^3$ .............................................. G21C 11/00
[52] U.S. Cl. ...................................... 376/339; 376/419; 376/447
[58] Field of Search ........................ 376/339, 419, 447

[56] References Cited

U.S. PATENT DOCUMENTS

| | | | |
|---|---|---|---|
| 3,108,886 | 10/1963 | Adamsky et al. | 376/339 |
| 3,423,324 | 1/1969 | Best et al. | 376/339 |
| 3,769,160 | 10/1973 | Shepherd et al. | 376/339 |

Primary Examiner—Sal Cangialosi
Attorney, Agent, or Firm—D. E. Erickson

[57] ABSTRACT

An improved annular burnable poison pellet of aluminum oxide-boron carbide ($Al_2O_3$—$B_4C$) adapted for positioning in the annular space of concentrically disposed zircaloy tubes. Each tubular pellet is fabricated from $Al_2O_3$ powders of moderate sintering activity which serves as a matrix for $B_4C$ medium size particle distrbution. Special pellet moisture controls are incorporated in the pellet for moisture stability and the pellet is sintered in the temperature range of 1630°–1650° C. This method of fabrication produces a pellet about 2 inch long with a wall thickness of about 0.020 inch to 0.040 inch. Fabricating each pellet to about 70% theoretical density gives an optimum compromise between fabricability, microstructure, strength and moisture absorption.

11 Claims, 2 Drawing Figures

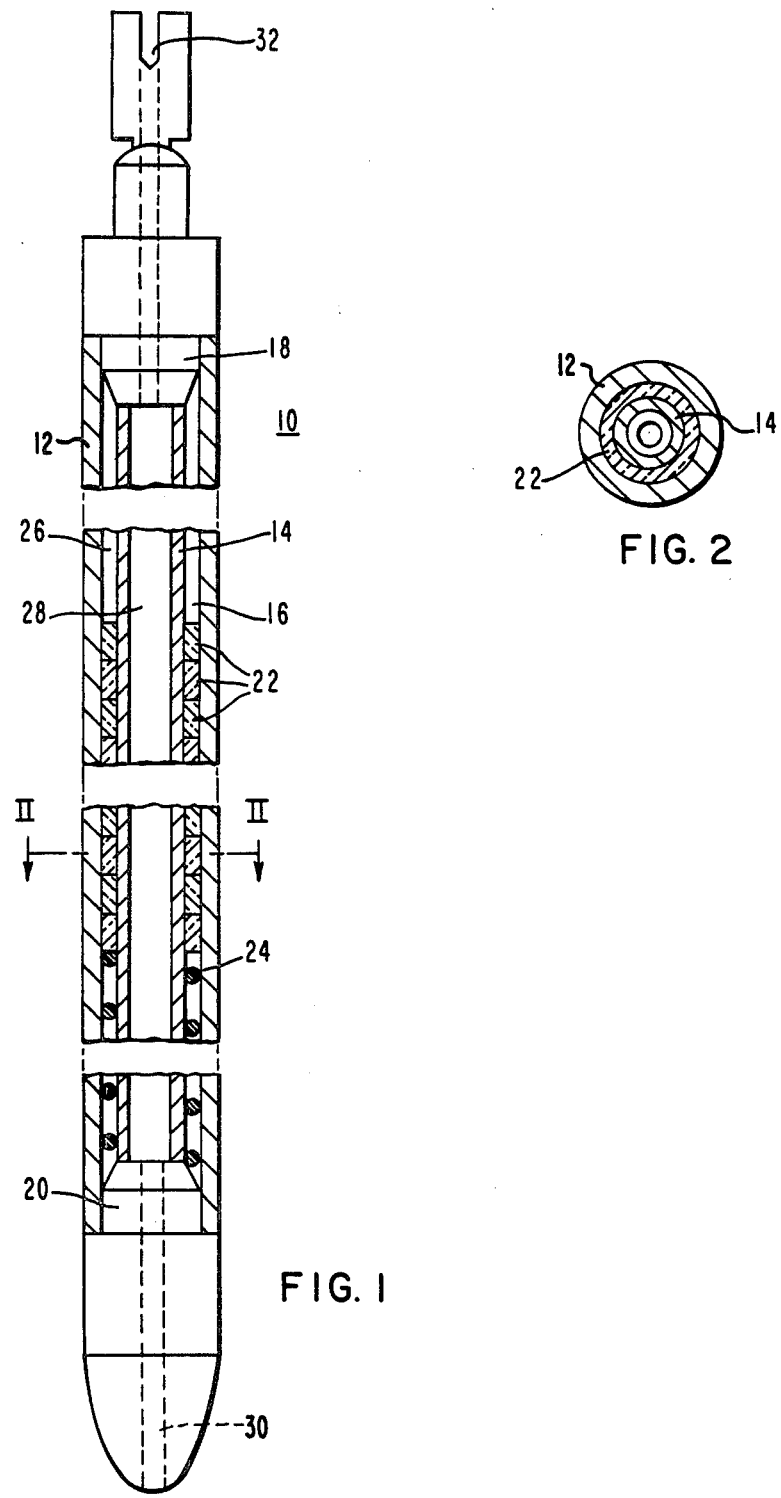

NEUTRON ABSORBER PELLETS WITH MODIFIED MICROSTRUCTURE

CROSS-REFERENCE TO RELATED APPLICATION

This application relates to application Ser. No. 915,691, filed June 15, 1978 and assigned to the same assignee as the present invention.

BACKGROUND OF THE INVENTION

The invention described herein relates to nuclear reactors and more particularly to an improved method of fabricating an annular neutron absorbing pellet used in burnable poison rods in the reactor, together with an improved pellet composition having desirable operating characteristics.

The burnable poison rod of the type more recently developed for use in nuclear reactors includes a pair of concentrically disposed zircaloy tubes having an annular space therebetween filled with neutron absorbing pellets of cylindrical configuration. Each pellet comprises boron carbide in an aluminum oxide matrix formed into a two-inch long tube of thin wall construction of about 0.020 inch to 0.040 inch thereacross. Hollow end plugs seal the pellets in the annular space but reactor coolant is permitted to flow upwardly through the center tube and outside the outer tube during reactor operation. This design results in a reduction of fuel cycle cost and increased flexibility in core fuel management.

Investigations carried out during the course of making the present invention which relates to a burnable poison pellet as such, reaffirm that as the pellets are irradiated, they undergo dimensional changes of a magnitude sufficient to structurally deform the concentric tubes in which they are enclosed. The dimensional changes result from densification and swelling in the pellet body. Densification takes place as a result of removal of porosity by irradiation and thermal processes in a reactor. Swelling occurs as the $B_{10}$-neutron reaction produces solid fission products and helium gas which fill pores intentionally incorporated in the pellet body.

The hygroscopic characteristics of the aluminum oxide ($Al_2O_3$) presents another disadvantage when used in the reactor. After manufacture, the $Al_2O_3$—$B_4C$ pellets rapidly absorbs moisture which must be removed prior to being loaded and sealed in the zircaloy tubes' annular space, otherwise hydriding of the zircaloy tubes could later occur with possible tube failure. Since these pellets are of varying theoretical density, e.g., more than 60% theoretical density, and have relatively high internal surface areas, moisture absorption can range to values greater than 1,000 ppm. Although the pellets are readily dried by heating to about 300° C., they nevertheless reabsorb moisture in a matter of minutes. Consequently, the pellets must be preserved in a very dry atmosphere after drying to prevent moisture reabsorption to levels in excess of the specification. Should atmospheres of this type not be available, and in absence of still other ways to control pellet moisture, the need then exists to protect the pellet against moisture infiltration by requiring that pellets be loaded into a burnable poison rod, including pressuring and end plug sealing, in a dry glove box environment or other arrangement where the pellets will not be exposed to humidity in the atmosphere. It is evident that fabrication of rods under these conditions would not only increase manufacturing cost substantially but would require rigorous quality control procedures to help assure the pellets have not reabsorbed excessive moisture after drying.

These and other disadvantages which will be apparent as the description proceeds, suggest that the need is great for burnable poison pellets designed to be stable in the operating environment of a reactor by being highly resistant to dimensional change, and which contain an equilibrium moisture content which will not significantly produce hydriding as the pellets are irradiated during reactor operation.

SUMMARY OF THE INVENTION

An improved annular burnable poison pellet of aluminum oxide-boron carbide ($Al_2O_3$—$B_4C$) adapted for positioning in the annular space of concentrically disposed zircaloy tubes. Each tubular pellet is fabricated from $Al_2O_3$ powders of moderate sintering activity which serves as a matrix for $B_4C$ medium size particle distribution. Special pellet moisture controls are incorporated in the pellet for moisture stability and the pellet is sintered in the temperature range of 1630°–1650° C. This method of fabrication produces a pellet about 2 inch long with a wall thickness of about 0.020 inch to 0.040 inch. Fabricating each pellet to about 70% theoretical density gives an optimum compromise between fabricability, microstructure, strength and moisture absorption.

BRIEF DESCRIPTION OF THE DRAWINGS

While the foregoing discussion identifies problems presently existing in the prior art together with the general description of how they may be overcome, it is believed the following disclosure of the preferred embodiment of the invention will be better understood by reference to the accompanying drawing wherein:

FIG. 1 is a view in elevation, partly in section, of a burnable poison rod having pellets therein made in accordance with this invention; and FIG. 2 is a view taken on lines II—II of FIG. 1.

DESCRIPTION OF THE PREFERRED EMBODIMENT

Referring now to the drawing wherein like reference characters designate like or corresponding parts throughout the several views, there is shown a burnable poison rod 10 including a pair of concentrically disposed zircaloy tubes 12, 14 which form an annular space 16 therebetween. End plugs 18, 20 in each end of the rod seal neutron absorbing pellets 22 in the annular space. The pellets are of cylindrical or tubular configuration and comprise boron carbide ($B_4C$) in an aluminum oxide matrix ($Al_2O_3$). Each pellet is of about 70% theoretical density, measures about 2 inch long and has a wall thickness of about 0.020 inch although other sizes may be used depending on the size and configuration of the fuel assembly. The pellet stack is supported by spring 24 and plenum 26 serves as a storage area for gases and other fission products. Reactor coolant flows around the 0.381 inch diameter outer tube 12 and upwardly through passageway 28 in center tube 14 via inlet 30 and outlet 32. Coolant flow in this manner enhances the thermal flux in the poison cell and thus increases the effectiveness of the poison at the beginning of life (BOL), and permits boron in the burnable poison to deplete at a faster rate during reactor operation with a more acceptable burnable poison penalty near the end of the fuel cycle. Besides boron, other poison materials such as gadolinium, samarium, cadmium, europium, hafnium and indium may be used as a neutron absorbing material. $Al_2O_3$—$B_4C$ was selected because of its favorable neutronic behavior, fabricability, strength, cost, ability to vary the B10 loading over a wide range, chemical compatibility with the zircaloy cladding and its known irradiation behavior. The following description of the invention relates more specifically to the method of fabricating the above tubular burnable poison pellet to provide a pellet having superior composition characteristics.

Although different pellet manufacturing processes will occur to those skilled in the art, one successful method of preparing $Al_2O_3$—$B_4C$ compositions generally included ball milling 100 gm–200 gm batches of material in deionized water for 16 hours to ensure homogeneous and agglomerate breakdown. A sintering aid, such as silicic acid, talc, sodium silicate or silica, preferably silicic acid, was added and thoroughly mixed in the composition, after which the material was spray-dried and the powder screened through a −100 mesh screen to produce a free-flowing powder of about 50 microns particle size. A highly sinterable powder, such as Alcoa A16SG alumina powder, and other $Al_2O_3$ powders such as Alcoa A15, or Reynolds HBDBM produce acceptable products. Carborundum large $B_4C$ particles (−100 mesh) have better sinterability and lower moisture resistance than finer $B_4C$ and this coarse material is therefore used at about a 14.85 wt.% level. All pellets were isostatically pressed and sintered at varying temperatures in dry argon, or wet argon, for either a minimum hold time (6–10 minutes) or 3 hours.

Moisture data was obtained on pellets measuring approximately 0.5 inch–0.75 inch long using a CEC moisture analyzer. The test schedule was 300° C. for 30 minutes with the analyzer standardized with sodium tartrate. Immersion densities of each composition were obtained.

Development of the nuclear absorbing material having the required combination of properties required evaluation of different $Al_2O_3$ and $B_4C$ powders, sintering additives to help control moisture equilibrium levels, sintering conditions and evaluation of resulting properties. Fabricability constraints limit the wall thickness to no less than 0.020 inch with a 2-inch pellet length to accommodate ease of handling. Zircaloy tubing constraints favored a design of low helium release and a specified theoretical density of 70% to accommodate $B_4C$ particle swelling.

Referring more specifically to details of the invention, in carrying out the developmental work, different phases were used to evaluate the powders and sintering aids and to eventually determine the optimum ratio or mix of substances in the pellets. Acceptable powders included Norton Company $B_4C$ powder, Reynolds Company powder HPDBM, a high purity powder of high sintering activity, and Alcoa powders A16SG, A15SG and A15 which, in order, possess decreasing sintering activity. (The SG designation relates to surface grinding of the pellet.) Since studies during the development work showed that low levels of addition of silicon containing compounds markedly reduced the equilibrium moisture content of pellets, the sintering aids chosen for investigation was silicic acid at levels 0.5, 1.0, 1.5, 2.0, 3.0, 4.0 and 5.0 wt.% equivalent $SiO_2$, together with talc, sodium silicate and $SiO_2$. Silicic acid has good solubility in water which helps assure good dispersion during the slurry mixing stage. All powders are commercially available.

All compositions containing the above compounds were prepared by mixing the $Al_2O_3$ (A16SG) sintering aid and about 15 wt.% $B_4C$ powder for 16 hours followed by drying, screening through a 100 mesh screen, and then fabricating the annular pellet by isostatic pressing. The pellets were dewaxed in a vacuum of less than $5 \times 10^{-6}$ Torr prior to sintering in an argon pusher furnace.

Sintering schedules were varied to study the effect on moisture properties. These included dry and wet (about $1 \times 10^{-4}$ p $H_2O$) argon atmospheres with a 3-hour soak time at 1517° C., a 3-hour soak time in wet argon at 1570° C. and a double sintering at 1575° C. in wet argon for a total time of 6 hours.

The results of a specific investigation are listed in Table 1.

TABLE I

| INITIAL MOISTURE STABLE PELLET RESULTS | | | | | | | |
|---|---|---|---|---|---|---|---|
| | Sintering Aid | Wt %* Sin- | Sintering Conditions | | Density | Avg Moisture° ppm | |
| Identity | Composition | tering Aid | T, °C. | t, hr | % TD | High RH | Low RH |
| 20 CS4 | Silicic Acid | 0.01 | 1500 | 0.1 | 79.40 | 438 | 239 |
| 20 CS3 | " | 0.05 | 1500 | 0.1 | 80.04 | 227 | 231 |
| 20 CS3 | " | 0.05 | 1500 | 3.0 | 80.20 | 135 | 100 |
| 20 CS2 | " | 0.10 | 1500 | 0.1 | 80.15 | 252 | 153 |
| 20 CS2 | " | 0.10 | 1500 | 3.0 | 79.85 | 164 | 100 |
| 20 CS1 | " | 0.25 | 1500 | 0.1 | 79.93 | 257 | 104 |
| 20 CS1 | " | 0.25 | 1500 | 3.0 | 79.87 | 208 | 99 |
| 20 CS | " | 0.50 | 1500 | 0.1 | 72.37 | 192 | 142 |
| 20 CS5 | " | 1.00 | 1500 | 0.1 | 79.79 | 377 | 240 |
| 20 T | Talc | 0.50 | 1500 | 0.1 | 70.94 | 389 | 233 |
| 20 N | Sodium Silicate | 0.50 | 1500 | 0.1 | 68.47 | 615 | 182 |
| 20 S | $SiO_2$ | 0.50 | 1500 | 0.1 | 72.76 | 538 | 147 |
| 20 S-1$^\beta$ | Silicic Acid | 0.05 | 1500 | 0.1 | 69.62 | 510 | 425 |

° Low humidity, 10–30% relative (RH) at 75° F.
High humidity, 80–90% relative (RH) at 75° F.
$^\beta$ All compositions contained 14.85 wt % $B_4C$ in A16SG $Al_2O_3$ powder. Except for 20 S-1, which contained Carborundum, fine $B_4C$, all compositions contained −100 mesh $B_4C$ powder.
*Based on oxide weight.

The sintered density and average moisture content of the compositions of Table 1, equilibrated at two humidity levels show that silica and moderate levels of silicic acid (0.05–0.25 wt.%, $SiO_2$ equivalent) and sintering times were required to limit the moisture absorption properties, whereas density was achieved when the sintering temperature had been reached. Also, fine $B_4C$ powder caused higher levels of moisture than coarse powder due to the sintering inhibitor effect of the $B_4C$ creating greater quantities of fine interconnected porosity and hence open surface for moisture absorption. The low adsorption after equilibrating at the high humidities suggests the potential for greatly reducing the moisture pickup of the pellets, but it should be noted that the $B_4C$ powder used (less than 75 microns) could not reasonably be used for the absorber pellets.

The results listed in the following Table II show that the reduction in $B_4C$ particle size does increase the moisture adsorption. This Table lists the results for various additions of silicic acid in several $Al_2O_3$ powders, all containing 5–20 microns $B_4C$ particle size powder. The data shows that significant changes in performance occurred depending on the sintering schedule, and that an appreciable reduction in moisture content was obtained in practically every case with increases in sintering temperature and time.

densities, whereas silicic acid additions produced lower densities due to the greater volume reduction on sintering.

TABLE II

DENSITY AND MOISTURE RESULTS FOR INITIAL STUDY, PHASE I

| Identity and Al$_2$O$_3$ Powder Type | Wt %♦ Sintering Aid | Immersion▲ Density 1517° C. Dry Ar 3 hr | Immersion▲ Density 1517° C. Wet+ 3 hr | Avg ppm Moisture Wet, 3 hr | Immersion▲ Density 1570° C. Wet+ 4.5 hr | Avg ppm Moisture Wet, 4.5 hr | Immersion▲ Density Resintered 1575° C. Wet,+ 6 hr | Avg ppm Moisture Wet, 6 hr |
|---|---|---|---|---|---|---|---|---|
| SA 10 HPDBM* | 0.25 | 73.31 | 74.34 | 330 | 73.78 | 188 | 75.41 | 99 |
| SA 20 HPDBM* | 0.5 | 70.21 | 71.66 | 395 | 73.99 | 192 | 75.10 | 84 |
| SA 30 HPDBM* | 1.0 | 73.82 | 72.52 | 286 | 71.92 | 160 | 76.32 | 68 |
| SA 40 HPDBM* | 1.5 | 71.27 | 71.22 | 403 | 75.58 | 159 | 76.82 | 136 |
| SA 50 HPDBM* | 2.0 | 72.92 | 70.61 | 276 | 75.24 | 255 | 75.88 | 116 |
| SA 60 Al5SG | 1.0 | 71.23 | 71.05 | 412 | 74.58 | 254 | 75.43 | 69 |
| SA 70 Al6SG | 1.0 | 77.39 | 76.23 | 243 | 76.90 | 148 | 78.09 | 96 |
| SA 80 HPDBM | 3.0 | 75.57 | 75.84 | 222 | 78.58 | 97 | 77.94 | 131 |
| SA 90 HPDBM | 4.0 | 75.55 | 74.96 | 142 | | | 76.53 | 47 |
| SA 100 HPDBM | 5.0 | 74.95 | 74.70 | 209 | 65.79 | 171 | 75.98 | 101 |
| SA 110 Al5SG | 1.0 | 72.75 | 73.24 | 138 | 73.05 | 140 | 72.74 | 70 |
| SA 120 A15 | 1.0 | 66.31 | 65.15 | 190 | 65.80 | 110 | 71.89 | 65 |

*Reynolds HPDBM: Alcoa A16SG, A15SG, A15.
♦ Silicic Acid: Amount added based on SiO$_2$; SA 60 and SA 110 are duplicates.
▲ % TD.
+ ~1 × 10$^{-4}$ atm H$_2$O in Ar

TABLE III

DENSITY AND MOISTURE RESULTS FOR PHASE II

| Identity | Sintering Aid and Amount* Wt % | Immersion▲ Density 1570° C. Wet 3 hr | Avg ppm Moisture | Immersion▲ Density 1570° C. Wet 4.5 hr | Avg ppm Moisture♦ High RH | Low RH | Immersion▲ Density Resintered 1575° C. Wet, 6 hr | Avg ppm Moisture |
|---|---|---|---|---|---|---|---|---|
| SA 130 | 0.5 Silicic Acid | 72.32 | 68 | 73.58 | 153 | 173 | 71.68 | 83 |
| SA 140 | 2.0 Silicic Acid | 72.28 | 34 | 71.71 | 233 | 203 | 72.75 | 60 |
| SA 150 | 1.0 Silicic Acid + 1 MgO | 73.22 | 41 | 71.72 | 79 | 91 | 72.86 | 43 |
| SA 160 | 1.0 Talc | 73.44 | 58 | 74.66 | 168 | 306 | 75.43 | 93 |
| SA 170 | 1.0 SiO$_2$ | 72.99 | 29 | 73.09 | 111 | 121 | 73.64 | 75 |
| SA 180 | 1.0 SiO$_2$ + 1 MgO | 74.59 | 71 | 73.43 | 120 | 147 | 73.72 | 95 |
| SA 190 | 1.0 Silicic Acid + 1 Magnesium Acetate | 70.08 | 39 | 69.04 | 136 | 226 | 68.98 | 82 |

Al$_2$O$_3$ powder is Alcoa A15SG.
*Amount is based on respective oxide.
♦ Pellets stored in high humidity environment of ~70% relative (RH) at 75° F. Normal atmospheric conditions 20-40% RH.
▲ % TD.

It is also evident that increasing sintering aid levels did not reduce the water adsorption capacity of the pellets in a systematic manner, and the differences observed were attributed to experimental scatter. However, the lowest readings for the Reynolds HPDBM powder were obtained with SiO$_2$ levels of 3-5 wt.%. Low moisture levels were also obtained with Alcoa Al$_2$O$_3$ powders, types A15 and A15SG, with low levels of SiO$_2$ (1.0 wt.%).

Table III shows density and moisture results where concentration was placed on the A15 SG powder, and SiO$_2$, silicic acid and talc. MgO was added in compositions SA 150 and SA 180 as the oxide, and as magnesium acetate in SA 190 to act as a pore former. The 4.5 hr. sintered pellets gave what are considered to be anomalgous results. It is apparent that practically all these compositions can be made moisture stable on average, but adsorption kinetics and range of the data indicate that three compositions, namely, SA 140, 170 and 190 were the best.

From Table III it further can be seen that the type of sintering aid markedly influenced pellet density. The magnesium acetate addition SA 190 acts as a pore former, reducing the density 3-4% compared to the oxide addition, SA 150. The addition of SiO$_2$ and MgO and also talc (a magnesium silicate) produced the highest The data implying improved resistance to moisture adsorption with increase in sintering aid and sintering temperature, as well as the questionable influence of centerless grinding of the circumference of the pellets, led to further developmental effort. The same three sintering aids were added at levels of 4 wt.% SiO$_2$ as silicic acid (SA 142), 3 wt.% SiO$_2$ (SA 172), and 3 wt.% SiO$_2$ as silicic acid +3 wt.% SiO$_2$ as magnesium acetate (SA 192), with the results shown in Table IV as well as data for two control compositions without sintering aids. The moisture information for all compositions, except composition 202, are practically indentical with very low indicated values. The Carborundum, fine B$_4$C powder in composition 202 reduced the sinterability of the active A16SG, resulting in large amounts of fine porosity and open surface for adsorption, thus accounting for the higher readings, but the processing conditions reduced the moisture level substantially from the previous levels of ~750 ppm. The as-received undried moisture levels are higher than the dried readings and this is attributed to possible lower ambient humidity levels existing at a distantly located manufacturing plant where the pellets were inside, thus resulting in higher adsorbed levels. It has been found that, although pellets rapidly adsorb moisture to equilibrate with the surrounding environment, they are very slow to reduce the level if the ambient is at lower humidity.

Differences in sintered density are, however, apparent. Composition CBP2 without sintering aid showed an average density close to 80% TD whereas SA 142 and 172 were above the 70% upper limit of the Reference pellet specification, and SA 192 was just below the limit of 65% TD; no real difference can be attributed to either wet or dry argon sintering atmospheres.

Metallographic sections of compositions SA 142, 172, 192 and CBP2 show that at low magnification, the 80% theoretical density CBP2 pellets have the $B_4C$ particles practically totally surrounded by $Al_2O_3$ allowing no room for swelling. To a lesser extent, this is also true of SA 142 whereas SA 172 and SA 192 show a more open pore network with coarse pores frequently associated with the $B_4C$ particles. Of these latter compositions, the $Al_2O_3$ matrix of SA 172 appears more open and irregular than that of SA 192, with SA 192 tending to have more large porosity associated with the $B_4C$ particles.

TABLE V

| Composition | MOISTURE DATA◊ | | | | |
|---|---|---|---|---|---|
| | As Sintered; Unground | Ground | Not Ground; Resintered | Resintered, Ground | Ground, Resintered |
| High Density Moist-1 NFD 31060-1 | 222 | 756 | 389 | — | 225 |
| Reference Ref-1,-2,-3 NFD 31063-1 | 294 | 624 | — | 519 | 425 |
| Structurally Stable Struc-1 NFD 31060-2 | 348 | (100)* | — | — | 352 |

TABLE IV

MOISTURE DATA FOR FINAL COMPOSITIONS AND CONTROLS

| Identity | AR ATM | Immersion Density % TD | Undried Moisture, ppm | | | Dried Moisture, ppm for Exposure Time, hr | | | | | | | | |
|---|---|---|---|---|---|---|---|---|---|---|---|---|---|---|
| | | | 1 | 2 | Avg | 1 | 2 | 3 | 4 | 5 | 6 | 7 | 8 | Avg |
| SA 142 | Wet | 73.54 | 79 | 119 | 99 | 45 | 38 | 64 | 45 | 54 | 62 | 47 | 72 | 53 |
| | | | | | | 0.33 | 2.67 | 21.58 | 23.33 | 25.08 | 27.58 | 47.33 | 48.83 | |
| | Dry | 70.32 | 88 | 146 | 117 | 17 | 46 | 83 | 44 | 62 | 61 | 51 | 66 | 54 |
| | | | | | | 0.17 | 1.5 | 21.42 | 23.17 | 24.92 | 27.42 | 47.17 | 48.67 | |
| SA 172 | Wet | 71.37 | 86 | 82 | 84 | 29 | 39 | 44 | 60 | 49 | 58 | 60 | 57 | 50 |
| | | | | | | 0.67 | 3.0 | 21.92 | 23.67 | 26.17 | 27.92 | 47.67 | 49.17 | |
| | Dry | 72.48 | 99 | 82 | 91 | 32 | 52 | 52 | 42 | 39 | 52 | 49 | 50 | 46 |
| | | | | | | 0.5 | 2.83 | 21.75 | 23.50 | 26 | 27.75 | 47.50 | 49 | |
| SA 192 | Wet | 63.04 | 183 | 119 | 151 | 36 | 53 | 53 | 64 | 60 | 68 | 53 | 68 | 57 |
| | | | | | | 1.0 | 3.3 | 22.25 | 24 | 26.5 | 28.25 | 48 | 49.5 | |
| | Dry | 65.78 | 117 | 106 | 112 | 47 | 64 | 65 | 58 | 56 | 62 | 52 | 59 | 58 |
| | | | | | | 0.83 | 3.17 | 22.08 | 23.83 | 26.33 | 28.08 | 47.83 | 49.33 | |
| CBP2* | Wet | 79.03 | 81 | 70 | 76 | 40 | 65 | 54 | 45 | 51 | 53 | 50 | 44 | 50 |
| | | | | | | 1.92 | 3.58 | 22.58 | 24.33 | 26.83 | 45.08 | 48.33 | 49.83 | |
| | Dry | 79.11 | 70 | 80 | 75 | 48 | 48 | 33 | 76 | 68 | 57 | 56 | 53 | 55 |
| | | | | | | 1.75 | 3.42 | 22.42 | 24.17 | 26.67 | 28.42 | 48.17 | 49.67 | |
| 202 | Dry | 67.76 | 184 | 208 | 196 | 150 | 283 | 154 | 157 | 153 | 177 | 208 | 149 | 179 |
| | | | | | | 2.08 | 3.75 | 22.75 | 24.5 | 27.0 | 45.25 | 48.5 | 50.0 | |

Pellets tested at 25–40% relative humidity, 75° F.
*No sintering aid.
23.4 wt % Carborundum $B_4C$ in A16SG $Al_2O_3$ powder.

The foregoing disclosure shows that the adsorption of water in low density, hygroscopic $Al_2O_3$—$B_4C$ annular pellets can be controlled. The results indicate that it is not so much the sintering aid additives that provide the stability, but a combination of proper choice of $Al_2O_3$ powder size of $B_4C$ particles, sintering temperature and time, and also annealing of the damage introduced by the centerless grinding and cutting to length of the final pellets.

That this annealing treatment is essential to the control of moisture adsorption has been firmly established and Table V lists some of the data that confirm this requirement. Extensive developmental work carried out with different pellet compositions, makes it clear that the damage introduced by grinding the pellets, which includes microcracking and production of new, virgin, $Al_2O_3$ surface, greatly increases the pellet's propensity for moisture adsoprtion. Such adsorption can be reduced, often to the as-sintered pellet level, by resintering or annealing in which the strain energy introduced during grinding is released causing the new surfaces to anneal and the microcracks to heal.

This annealing step is essential to moisture stability. Either the pellets are fabricated, ground and resintered or, alternatively, the pellets can be biscuit fired to provide some green strength and preferably ground to size prior to the final sintering step.

| Reference R&W NFD 31063-1 | 143 | 242 | — | — | 158 |

Pellets tested at 300° C.
◊ ppm.
*VAC dried prior to test.

It is believed that the action of the sintering aid additions in reducing moisture adsorption is by modification of the surface structure of the $Al_2O_3$ grains. $SiO_2$ is relatively insoluble in $\alpha$-$Al_2O_3$, and it is thought that the $SiO_2$ predominantly forms a surface film on the $Al_2O_3$ grains. Consequently, additions greater than that required to coat the $Al_2O_3$ grains would not reduce moisture adsorption further, and greater additions would be required to produce the same results with a fine grained, active powder such as Reynolds HPDBM or Alcoa A16SG than for less active, slightly coarser powders such as the A15 and A15SG types. Order of magnitude calculations indicate that assuming uniform spherical $Al_2O_3$ particles having measured average diameters of 1.0 μm for A16SG, 0.38 μm for HPDBM and 2.8 μm for A15SG, a monomolecular film of $SiO_2$ would be formed with about 0.7, 1.7 and 0.2 wt.% addition, respectively. This assumes that the additive is in a form that can produce a uniform thin film, whereas solid additions would tend to form areas of high concentration, and thus would require greater levels to provide a complete film.

With this simplistic approach, it can be seen that for a given level of addition to A15SG, a 7X greater level would be required to provide an equivalent moisture stability in HPDBM $Al_2O_3$, and 3X for A16SG. Using this rationale some of the results obtained can be put into perspective. In Table II, levels of 3-5 wt.% $SiO_2$ (as silicic acid) provided about the same moisture properties in HPDBM $Al_2O_3$ as 1 wt.% in A16SG powder, as predicted, whereas 1 wt.% in A15 and A15SG should and did give lower levels of moisture (discounting compositions SA 60 and SA 90 which are considered anomalous).

To summarize, moisture stability for $Al_2O_3$—$B_4C$ pellets requires the use of an $Al_2O_3$ powder of medium sintering activity with additions of a sintering aid preferably of the thermally degradable type to provide large pores adjacent to the $B_4C$ particles. It appears that composition SA 192 is closest to ideal, but the level of the additives could be reduced slightly to increase the density. Both SA 142 and 172 are also considered suitable, with SA 172 containing the lowest level of $SiO_2$ addition (3 wt.%). The sequential improvement of the moisture data implies that sintering temperature increases to 1630°-1650° C. are necessary to reduce the equilibrium moisture levels to ~50 ppm (SA 142, 172, 192), and the annealing treatment after grinding may be considered mandatory.

$Al_2O_3$—$B_4C$ pellets can be made showing equilibrium moisture levels of less than 100 ppm.

Additions of $SiO_2$ alone, or in combination with MgO, both as oxides and simple compounds, can be used to effect this moisture stability. To maintain the density range of 65-70% TD, thermally degradable compounds which act as pore formers should be used.

$Al_2O_3$ powders of moderate activity, such as Alcoa A15 and A15SG, also should be used. Sintering temperatures of 1630°-1650° C. are recommended. An annealing treatment after centerless grinding is mandatory for most pellets.

The results indicate levels of sintering aid in the range 1-4 wt.% $SiO_2$ provide adequate moisture stability. Conservative limits of 3-4 wt.% are recommended.

It will be apparent that many modifications and variations are possible in light of the above teachings. It therefore is to be understood that within the scope of the appended claims the invention may be practiced other than as specifically described.

I claim:

1. A sintered burnable absorber pellet for use in a nuclear reactor fuel assembly comprising:
a body of burnable absorber material adapted for positioning in the space between a pair of metal rods in said assembly, said material including aluminum oxide which serves as a matrix for a neutron absorbing compound selected from the group of boron, gadolinium, samarium, cadmium, europium, hafnium and indium, and
a sintering additive in said material for limiting the moisture adsorption of said material after sintering, said additive including silica containing compounds having an equivalent $SiO_2$ content of at least 1 wt.% of said material.

2. The pellet according to claim 1 wherein the burnable absorber material after sintering has a theoretical density of about 70%.

3. The pellet according to claim 1 wherein the sintering additive includes thermally degradable compounds which create pores in the absorber material on reduction to their respective oxides.

4. The pellet according to claim 1 wherein said $SiO_2$ content is between 1 and 5 wt.% of said material to provide equilibrium moisture levels in the pellet of less than 100 ppm.

5. The pellet according to claim 2 wherein the aluminum oxide is of moderate sinterability and the sintering additive includes between 1 and 5 wt.% silicon dioxide for imparting adequate moisture stability to the pellet.

6. The pellet according to claim 5 wherein the silicon dioxide produces a surface film of uniform thickness on particles on the aluminum oxide to impart moisture stability to the pellet.

7. The pellet according to claim 1 wherein the burnable absorber material includes boron carbide of between 5 and 20 μm particle size and boron carbide comprises between 2 and 25 wt.% of the absorber material.

8. The pellet according to claim 7 wherein the boron carbide comprises about 15 wt.% of the absorber material.

9. A sintered burnable absorber for use in a nuclear reactor fuel assembly comprising
a sintered pellet of burnable absorber material including moderately sinterable aluminum oxide and boron carbide particles of about 5 to 20 μm size for establishing a theoretical density of about 70% in the pellet, and
an additive of about 3-4 wt.% silicic acid for modifying the open surface areas in the pellet and providing adequate moisture stability to the pellet.

10. The process of manufacturing a burnable absorber pellet comprising the steps of:
mixing a sinterable alumina powder with about 15 wt.% boron carbide of about 5 to 20 μm particle size and an additive sintering aid including silica containing compounds having an equivalent $SiO_2$ content of at least 1 wt.% of the pellet for imparting moisture stability to the pellet;
spray drying the foregoing mixture, forcing the mixture into a pellet and isostatically pressing the pellet into a unified mass;
sintering the pellet at a temperature of 1625° C. ±25° C. in an inert gas;
grinding the pellet to a substantially uniform diameter, and thereafter annealing the pellet to remove strain energy introduced during grinding.

11. The process of claim 10, wherein said $SiO_2$ content is between 1 and 5 wt.% of the pellet to provide equilibrium moisture levels in the pellet of less than 100 ppm.

* * * * *